(12) United States Patent
Doan

(10) Patent No.: US 7,034,982 B2
(45) Date of Patent: Apr. 25, 2006

(54) METHOD OF IMPROVING THE PERFORMANCE OF MICROSTRUCTURES

(75) Inventor: Jonathan Doan, Mountain View, CA (US)

(73) Assignee: Reflectivity, Inc, Sunnyvale, CA (US)

( * ) Notice: Subject to any disclaimer, the term of this patent is extended or adjusted under 35 U.S.C. 154(b) by 121 days.

(21) Appl. No.: 10/823,823

(22) Filed: Apr. 13, 2004

(65) Prior Publication Data
US 2005/0225832 A1 Oct. 13, 2005

(51) Int. Cl.
*G02B 26/00* (2006.01)
*G01J 1/42* (2006.01)

(52) U.S. Cl. .............. 359/290; 359/291; 359/298; 356/218; 438/52; 216/2

(58) Field of Classification Search ............... 359/290, 359/291, 298, 292–295; 438/24, 48, 50, 438/51, 52, 53, 733; 216/2, 11, 13, 24; 257/80, 257/82, 415, 678; 356/218, 445
See application file for complete search history.

(56) References Cited

U.S. PATENT DOCUMENTS

| | | | | |
|---|---|---|---|---|
| 5,411,769 A | | 5/1995 | Hornbeck | 427/534 |
| 5,426,070 A | | 6/1995 | Shaw et al. | 216/2 |
| 5,835,256 A | | 11/1998 | Huibers | 359/291 |
| 6,046,840 A | | 4/2000 | Huibers | 359/291 |
| 6,088,474 A | | 7/2000 | Dudasko et al. | 382/145 |
| 6,204,085 B1 | * | 3/2001 | Strumpell et al. | 438/51 |
| 6,300,294 B1 | | 10/2001 | Robbins et al. | 508/524 |
| 6,523,961 B1 | | 2/2003 | Ilkov et al. | 353/99 |
| 6,529,310 B1 | | 3/2003 | Huibers et al. | 359/291 |
| 6,867,897 B1 | | 3/2005 | Patel et al. | 359/291 |
| 2003/0214639 A1 | | 11/2003 | Patel | 353/98 |
| 2003/0218753 A1 | | 11/2003 | Reuter | 356/445 |
| 2003/0223084 A1 | | 12/2003 | Mehri et al. | 356/614 |
| 2004/0008402 A1 | | 1/2004 | Patel et al. | 359/291 |
| 2004/0042000 A1 | | 3/2004 | Mehri et al. | 356/218 |
| 2004/0125346 A1 | | 7/2004 | Huibers | 353/98 |
| 2004/0156090 A1 | | 8/2004 | Patel et al. | 359/291 |
| 2005/0168795 A1 | * | 8/2005 | Huibers | 359/290 |
| 2005/0174626 A1 | * | 8/2005 | Huibers | 359/291 |

OTHER PUBLICATIONS

Craig R. Barrett, et al, "The Principles of Engineering Materials", 1973 by Prentice-Hall, Inc., 6-5- pp. 215-217, 8-6-pp. 275-282.

K. Komvopoulos, "Surface Texturing and Chemical Treatment Methods for Reducing High Adhesion Forces at Micromachines Interfaces" SPIE vol. 3512, Sep. 1998.

* cited by examiner

*Primary Examiner*—Loha Ben
(74) *Attorney, Agent, or Firm*—Gregory R. Muir

(57) ABSTRACT

A plastically deformable element of a microelectromechanical device is strained so as to improve the lifetime of the microelectromechanical device. The element of the device can be strained by deforming the element into a deformed state and holding the element at the deformed state for a particular time period so as to acquire an amount of plastic deformation. The operation states of the device are calibrated according to the states before straining and the acquired plastic deformation. After then, the device is operated in the calibrated states.

82 Claims, 3 Drawing Sheets

000
METHOD OF IMPROVING THE PERFORMANCE OF MICROSTRUCTURES

TECHNICAL FIELD OF THE INVENTION

The present invention is related generally to the art of microstructures, and, more particularly, to processing of deformable elements of microstructures.

BACKGROUND OF THE INVENTION

Microstructures such as microelectromechanical devices (hereafter MEMS device) having deformable elements may suffer from device failure when the deformable elements deform plastically. For example, the operation states (e.g. the "natural resting state) of the MEMS device change due to plastic deformation which in turn cause differences between the states to vary over time. The change of the states and variation of the relative distances may affect the performance of the MEMS devices, especially those devices (e.g. micromirrors) whose operations depend upon the differences between the states (e.g. the ON and OFF state of the micromirrors). When the plastic deformation exceeds a certain amount, the states or the difference between the states exceeds the tolerable amount—causing device failure.

Therefore, a method is desired for processing the deformable element of a MEMS device so as to improve the performance and lifetime of the device.

SUMMARY OF THE INVENTION

In an embodiment of the invention, a method for improving the lifetime of a microstructure having an element that plastically deforms and operates in a deformed and non-deformed state is disclosed. The method comprises: deforming the element to the deformed state; holding the element at the deformed state for a particular time period so as to acquire an amount of plastic deformation for the non-deformed state; and defining a new non-deformed state based on the original non-deformed state and the acquired plastic deformation.

In another embodiment of the invention, a method for improving the lifetime of a microstructure that has a deformable element and operates in a deformed and non-deformed state, wherein the states vary over time due to a plastic deformation is disclosed. The method comprises: acquiring an amount of plastic deformation for the non-deformed state; defining a new non-deformed state according to the original non-deformed state and the acquired plastic deformation; and operating the microstructure at the new non-deformed state and the deformed state.

In yet another embodiment of the invention, a method of improving the life time of a microstructure that has a deformable element and operates in a deformed and non-deformed state, wherein the states vary over time due to plastic deformation in the deformable element, and the lifetime depends upon a difference between the states is disclosed. The method comprises: determining a range of the difference between the states such that the microstructure operates properly when the difference of the states varies within the range; and limiting the variation of the states such that the difference between the states is within the determined range, further comprising: adjusting the non-deformed state through acquisition of an amount of plastic deformation for the non-deformed state such that the distance between the adjusted non-deformed state and the deformed state is within determined range.

In yet another embodiment of the invention, a method of improving the lifetime of a spatial light modulator having an array of micromirrors, wherein the micromirror has a reflective mirror plate attached to a hinge such that the mirror plate can rotate between an ON and OFF state is disclosed. The method comprises: setting a plurality of micromirrors of the array to a deformed state; waiting for a particular time period so as to acquire an amount of plastic deformation for a non-deformed state for each of the plurality of the micromirrors; and defining a new OFF state based on the original OFF state and the acquired plastic deformation.

In yet another embodiment of the invention, a method of improving the lifetime of a spatial light modulator having an array of micromirrors, wherein the micromirror has a reflective mirror plate attached to a hinge such that the mirror plate can rotate between an ON and OFF state is disclosed. The method comprises: acquiring an amount of plastic deformation for the non-deformed state; defining a new OFF state according to the original OFF state and the acquired plastic deformation; and operating the microstructure at the new OFF state and the ON state.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

FIG. 3b plots the extended view of the plot in FIG. 3a;

DETAILED DESCRIPTION OF THE EMBODIMENTS

The present invention disclosed a method for improving the performance and lifetime of a microstructure having a deformable element that plastically deforms and operates in a non-deformed state and a deformed state by straining the element. The improvement can be achieved by deforming the element in the deformed state and holding the element at the deformed state for a particular time period. The straining of the element can be expedited by performing the straining at raised temperatures. After straining, the deformable element acquires an amount of plastic deformation. A new non-deformed state is then defined for the operation of the microstructure according to the non-deformed state before straining and acquired plastic deformation after straining.

Even though plastic deformation may be developed in the deformable element during operation after straining, causing variations of the states, the difference between the varied states is within a tolerable range and does not result in device failure.

Theory Related to the Invention

The deformable element of the microstructure plastically deforms during operation. It is observed that the deformation increases with time monotonically; whereas the deformation rate decreases monotonically (the deformation rate is defined as the first order derivative of the deformation to time). Without losing generality, this theory will be discussed in the following with reference to operations of a micromirror device in FIG. 1 and FIG. 2. It is understood by those skilled in the art that the following discussion is for simplicity and demonstration purposes only; and should not be interpreted as a limitation. Instead, the theory is applicable to other type of microstructures that have deformable elements.

Figure 1:
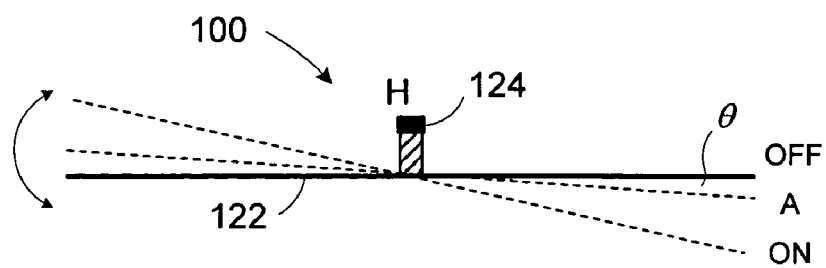
FIG. 1 is a diagram illustrating the operation of a micromirror device having a mirror plate attached to a hinge such that the mirror plate can rotate along a rotation axis.
Figure 2:
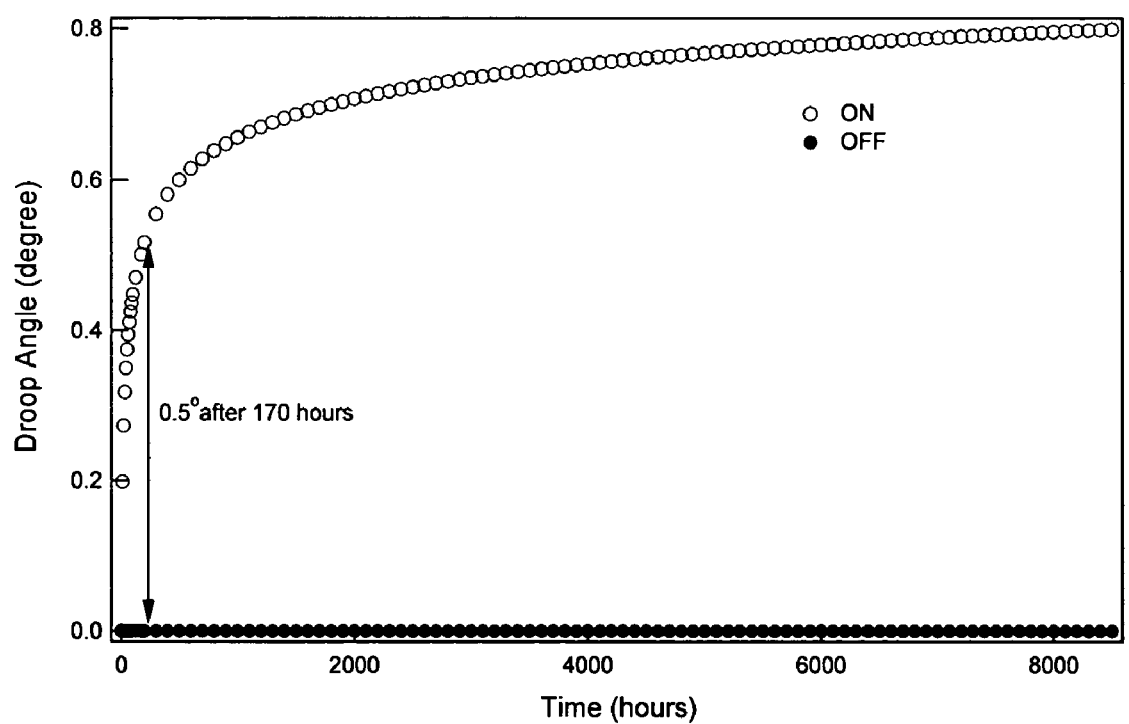
FIG. 2 plots the droop angle versus operation over time in an exemplary experiment.

Referring to FIG. 1, the deformable element is hinge 124 to which mirror plate 122 is attached such that the mirror plate rotates between the OFF and ON state as shown in the figure. The hinge deforms as the mirror plate rotates. During the rotation of the mirror plate between the ON and OFF state, plastic deformation can be developed in the hinge. As a consequence, the mirror plate will not be able to return to the original OFF state from the ON state under intrinsic mechanical restoration force (e.g. a torque induced during the course of rotation from the OFF state to the ON state immediately prior to the current rotation from the ON state to the OFF state). Instead, the mirror plate stops at an intermediate state A between the ON and OFF state. The intermediate state A and the OFF state has an angle θ. This phenomenon is referred to as "droop"; and the angle θ is referred to as "droop angle". The droop angle changes over the operation time. FIG. 2 illustrates an exemplary development of the droop angle over time of the micromirror device that is operated in a natural environment.

Referring to FIG. 2, each open circle represents a droop angle measured by holding the mirror plate at a deformed state (e.g. the ON state using an electrostatic force) for a time period; and releasing (e.g. removing the electrostatic force) the mirror plate to let the mirror plate to return to its natural resting state (e.g. can also be the OFF state) under the intrinsic mechanical restoration force in the hinge. The solid circle represents the OFF state angle.

As can be seen in FIG. 2, the droop angle monotonically increases with the operation time, while the rate of the increment rate of the droop angle decreases with the operation time. In particular, the overall profile of the droop angle curve exhibits a characteristic of a burst growth followed by a slow growth. For example, the droop angle monotonically increases from the initial value of 0° to around 0.81° after 10,300 hours of operation. However, the droop angle increases from 0° to around 0.5° after the first 170 hours of operation. That is, within the 10,300 hours of time scale, the droops angle achieves around 62% of the total angle within the first less than 2% of the total time period. And during the following 82% of total time period, the droop angle changes less than 38%.

As the droop angle increases, the "distance" between the ON and OFF state changes. The performance of the micromirror device, such as the contrast ratio of the displayed images certainly degrades. For example, assuming the tolerable maximum droop angle of the micromirror under the constraint of performance, such as contrast ratio or image retention requirement is 0.5°, the lifetime of the micromirror is around 170 hours according to FIG. 2. The image retention is often referred to as a phenomenon that an image is "burned" onto the screen after displaying the image on the screen for a period of time. The burned image on the screen will be displayed even though it is not intended to do so.

Methods of the Invention

In order to improve the lifetime of the microstructure, the deformable element is strained in compliance with the theory as discussed above prior to operation. The straining can be performed in many different stages of fabrications of the spatial light modulator. For example, the straining can be performed before or after assembling the microstructure, or before or after packaging of the spatial light modulator. If the straining is performed before joining the two substrates, an electrode can be provided for actuating the micromirrors. And it can also be performed after the spatial light modulator has been installed into a digital display system. In an embodiment of the invention, the deformable element (e.g. the hinge) is deformed to a deformed state by rotating the mirror plate attached to the hinge to the deformed state. The deformed state can be the ON state of the micromirror. For example, the ON state can be a state wherein the mirror plate is rotates to an angle of from 10° to 18° relative to a state when the mirror plate is flat. Alternatively, the deformed state can be an intermediate state between the ON and OFF state. For example, assuming that the ON and OFF state angles corresponding to the ON and OFF state are respectively 18° and 0°, the intermediate state can be a state wherein the mirror plate is rotated to an angle of from 0° to 18°. In another embodiment of the invention, the deformed state can be a negative OFF state, wherein the mirror plate is rotated to an angle of from −0.1° to −8°. The minus sign "−" represents that the mirror plate is rotated in an opposite direction to the OFF state relative to the ON state.

The hinge (also the mirror plate) is held at the deformed state for a particular time period. After the particular time period, the deformable hinge acquires an amount of plastic deformation at the non-deformed state (e.g. the OFF state). Then a new non-deformed state (e.g. the OFF state) is defined based on the original non-deformed state (e.g. the non-deformed OFF state before straining) and the acquired plastic deformation. The micromirror device will be operated in the new defined non-deformed state.

In an embodiment of the invention, the particular time period for holding the deformable element at the deformed state during straining is determined such that the acquired plastic deformation during the particular time period encompasses an amount of plastic deformation that accounts for a particular amount of the droop angle. In determining the straining time period, performance, such as contrast ratio of the displayed images need to be considered, because the change of the OFF state of the micromirrors due to the acquired plastic deformation during straining may degrade the quality (e.g. contrast ratio) of the displayed images. For example, the particular time period can be determined such that, after the particular time of straining, 1% or more, 1.5% or more, 2% or more or 5% or more of the total droop angle developed over a significant long time of operation, such as 10,300 or more, or 30,000 or more or 50,000 or more hours. Of course, the deformable element can be strained for a longer time period such that after the straining, 60% or more, or 75% or more, 80% or more of the total droop angle developed over the significant long time of operation.

For the example as shown in FIG. 2, the particular straining time period can be 20 minutes or more, or from 20 minutes to 24 hours, or 24 hours or more, or 170 hours or more. After around 10 hours of straining, the amount of plastic deformation acquired lifts the OFF state angle before starting by 0.2°—that is the difference between the ON and OFF state is reduced by 0.2°. Assuming the tolerable difference between the ON and OFF state for the micromirror is 0.6° or less (in practical operation, the tolerable difference is often much smaller, e.g. 0.25°), the life time for the micromirror device without straining would be around 500 hours. After straining, the life time can be more than 10,300 hours because the difference between the new OFF state and the ON state is far below 0.6° over the 10,300 hours. Even though extra plastic deformation may still be developed in the deformable hinge during operation afterwards—causing variations of the states, the plastic deformation increases slowly according to the theory. As a result, the difference between the ON and new OFF state is within a tolerable range and does not resulting in device failure over a significantly long operation time (e.g. 10,300 hours or more).

The particular straining time period can be determined in other alternative ways. In another embodiment of the invention, the straining time period can be determined according to the maximum tolerable droop angle of the micromirror in operation. For example, assuming that the maximum tolerable droop angle (the difference between the ON and OFF state) for the micromirror in operation is $\theta_{max}$ after $T_{max}$ hours of operation, the straining time period can be determined such that, after the straining time period, the droop angle is equal to or smaller than the maximum tolerable droop angle $\theta_{max}$.

In determining the straining time period, relaxation of the acquired deformation needs to be included in consideration. Because the acquired plastic deformation in the hinge at the OFF state may relax over time during operation, the OFF state may change and the droop angle for the OFF state may decrease. As a result, the difference between the ON and OFF state may gain extra increment over time. In the droop angle versus operation time plot, the OFF state will not be in parallel to the time axis. Instead, the OFF state line in the plot decreases over time during operation, which is between illustrated in FIG. 3b and will be discussed afterwards. Given the phenomenon of the relaxation of plastic deformation over time, the straining time period is determined so as to include the increment of the difference between the ON and OFF state due to decreasing of the OFF state.

As a way of example, the straining time for the deformable hinge can be range from 3 minutes to 500 hours or preferably from 1 hour to 24 hours. The straining of the deformable hinge can be expedited by thermal treatment. For example, if the straining is performed before bonding the two substrates, the deformable element can be heated to a temperature of from 80° to 300° or more, or from 300° to 500° or more. If the straining is performed after the two substrates are bonded together during a packaging stage, the maximum tolerable temperatures of other materials, such as sealing materials and lubricant or coating agents (e.g. self-assembly material for reducing stiction) applied to the surfaces of the micromirrors need to be considered. In this situation, the temperature for straining the deformable elements is below the maximum temperature allowed by these materials, such as a temperature of from 80° to 120°, or from 120 to 145° or from 145° to 300°. In selecting a proper heating temperature, other properties of the micromirror device need to be considered. For example, the selected heating temperature should be lower than the maximum tolerable temperature without causing defects or device failure.

After straining, a new OFF state is defined for the micromirror. Accordingly, other parameters, such as the electrical field strength for driving the mirror plate to the ON state need to be calibrated according to the new OFF state. For example, the micromirror at the ON state is often achieved by rotating the mirror plate attached to the hinge to the ON state angle in response to an electrostatic field. Because the strength of the field depends upon the distance between the mirror plate and the electrode, the strength is adjusted according to the change of the difference due to the change of the OFF state.

Figure 3A:
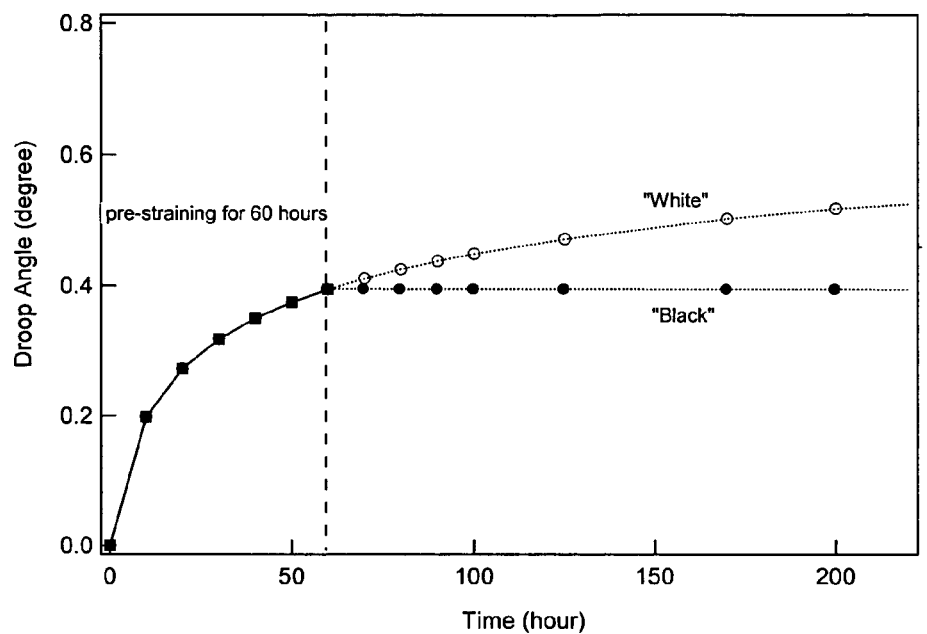
FIG. 3a plots the droop angle versus time after straining according to the invention.
Figure 3B:
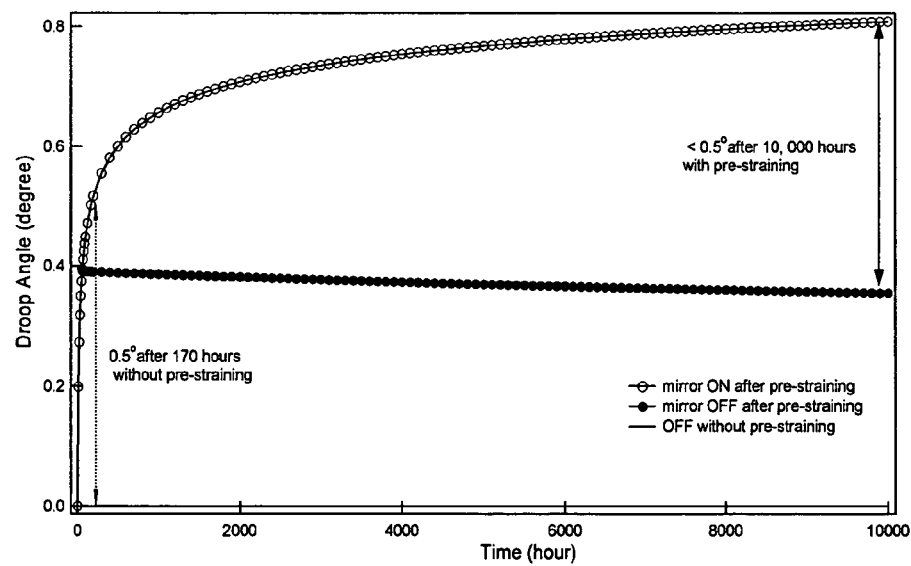

The present invention is of particular importance in improving lifetime of a device having multiple deformable elements, such as a spatial light modulator having an array of micromirrors, each of which comprises a deformable hinge to which a mirror plate is attached. In order to improve the lifetime of the spatial light modulator, the micromirrors are strained according to the invention. FIG. 3a and FIG. 3b plot the development of the droop angle over time after straining in an exemplary spatial light modulator.

Referring to FIG. 3a, the line with solid squares plots the droop angles (for all micromirrors) developed during the pre-straining process for 60 hours. After the 60 hours of pre-straining, the micromirrors in some areas are operated as fully ON ("white") as plotted in the dotted line with open circles, or in other areas the micromirrors remain OFF ("black") as plotted by the dotted line with solid circles. At selected period of time, the droop angles are measured. As can be seen in FIG. 3a, those micromirrors run in the ON or "white" areas shown an increase in their droop angles, whereas those micromirrors that are in the OFF or "black" areas shown a slight decrease in their droop angles over time. It is also possible to measure the contrast ratio in addition ot the droop angles at the selected time periods.

As can be seen in FIG. 3a, the OFF state of the micromirror obtained an initial droop angle of around 0.4° corresponding to an amount of plastic deformation acquired during the 60 hours of pre-straining. After the pre-straining, the micromirrors in the ON or "white" areas of the spatial light modulator still develop plastic deformation, causing the droop angle of the micromirrors to increase over time. Meanwhile the developed plastic deformation relaxes over time, causing the droop angle to decrease. The difference between the droop angles for the micromirrors held in the ON and OFF states increases over operation time. FIG. 3b illustrates the same plot in FIG. 3a in a wider operation time range.

Turning to FIG. 3b, because the "initial" OFF state is "lifted" to an initial droop angle of around 0.4°, the difference between the ON and OFF state after 10,000 hours of operation is less than 0.5°, even though the droop angle for the micromirrors held in the ON state increases due to further acquisition of plastic deformation in operation. As a comparison, assuming the maximum tolerable change in droop angle is 0.5° for the micromirror device of the spatial light modulator, the lifetime for the spatial light modulator without straining would be less than 170 hours. However, the lifetime of the spatial light modulator with straining is longer than 10,000 hours.

Figure 4:
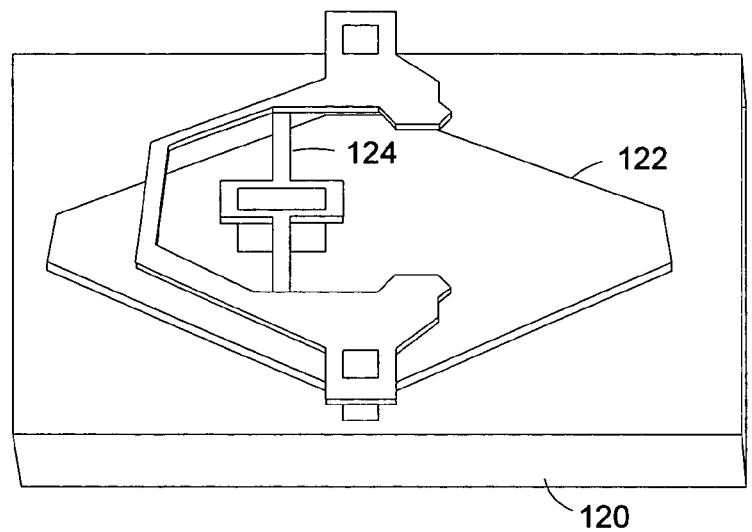
FIG. 4 is a perspective view of a portion of an exemplary micromirror device in which embodiments of the invention can be implemented.
Figure 5:
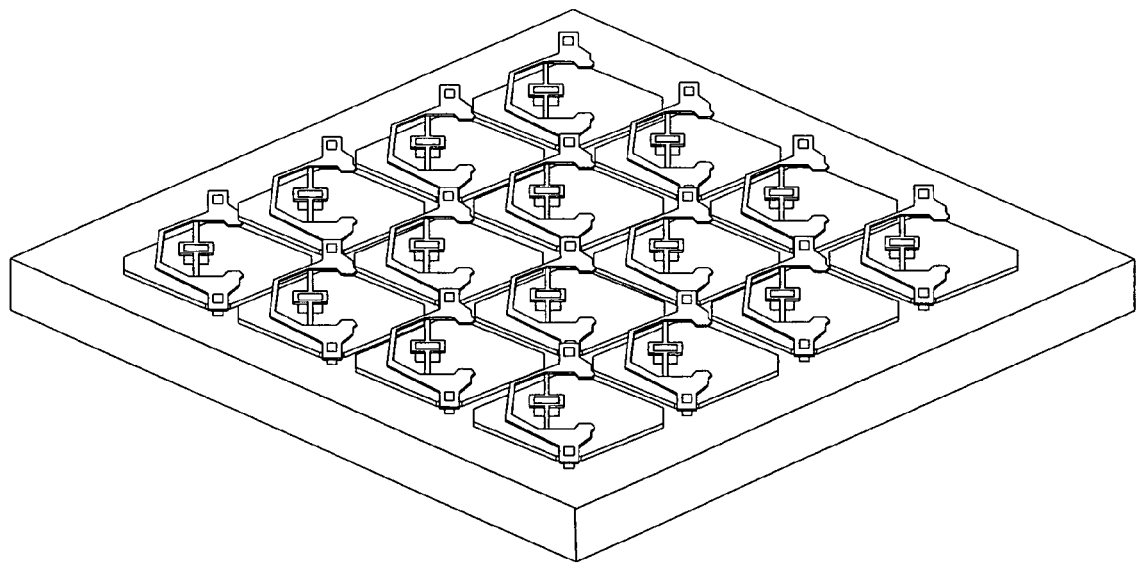
FIG. 5 is a perspective view of a portion of a spatial light modulator composed of an array of micromirrors in FIG. 4.

The present invention is applicable to a variety of micromirrors. As a way of example, FIG. 4 illustrates an exemplary micromirror device. Referring to FIG. 4, the micromirror device comprises hinge 124 that is formed on substrate 120. A reflective mirror plate 122 is attached to the hinge such that the mirror plate can rotate relative to the substrate. The substrate in the example is glass that is transmissive to visible light. Alternatively, the hinge and the mirror plate can be formed on a standard semiconductor wafer. Moreover, the hinge can be formed on the same side of the mirror plate as the substrate. In this particular example, the mirror plate is attached to the hinge such that the mirror plate rotates asymmetrically. Specifically, the attachment point of the mirror plate to the hinge is neither at the center of the mirror plate nor along a diagonal of the mirror plate when viewed from the top. The mirror plate can also be attached to the hinge in many other ways. For example, the mirror plate is attached to the hinge such that the mirror plate rotates symmetrically along a rotation axis. FIG. 5 presents a portion of a spatial light modulator having an array of micromirrors of FIG. 4. The micromirrors of the spatial light modulator are individually addressable.

The straining method of the present invention can be performed in many different stages of fabrications of the spatial light modulator. For example, the straining can be performed before or after packaging of the spatial light modulator. And it can also be performed after the spatial light modulator has been installed into a digital display system.

In addition to micromirrors or spatial light modulators that have an array of micromirrors, the present invention can be applied to many other types of microstructures having elements that can be plastically deformed, such as microelectromechanical devices. In those microstructures, the deformable elements are strained before the devices are released for operation. The states of the devices are re-defined according to the acquired plastic deformation of the deformable element during the straining. Then the devices are operated in the re-defined states. In fact, the straining method of the present invention can also be applied to microstructures having elements that deform along the lengths, such as an element that stretch along its length. For this type of microstructures, the deformable elements are held at the stretched states for a particular time period in order to acquire an amount of plastic deformation. New states are defined based on the states before straining and the acquired plastic deformation. The microstructure is then operated in the new states.

It will be appreciated by those of skill in the art that a new and useful processing method for improving the lifetime of microstructures having elements that plastically deform during operation has been described herein. In view of many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

I claim:

1. A method for improving the performance of a device having a movable microstructure that comprises a deformable element that plastically deforms and operates in a first deformed state and a second state, the method comprising:
   repeatedly actuating the element to the first deformed state; or holding the element at the first deformed state for a particular time period so as to cause the element to acquire an amount of plastic deformation that is at least 1.5% of a predetermined maximum plastic deformation that can be developed during the operation of the element; and
   delivering the device to a customer.

2. The method of claim 1, wherein the predetermined maximum plastic deformation is an amount of plastic deformation developed after at least 10,000 hours of operation of the element.

3. The method of claim 2, wherein the customer is a projection system manufacture.

4. The method of claim 1, wherein the predetermined maximum plastic deformation is equivalent to a droop angle for the element of 0.8° or more.

5. The method of claim 1, wherein the step of repeatedly actuating the element further comprises:
   repeatedly actuating the element to the first deformed state in response to a series of signals each corresponding to an ON state so as to achieve a maximized brightness.

6. The method of claim 1, wherein the customer is a retail customer and the microstructure is a micromirror within a spatial light modulator of a projection system.

7. The method of claim 6, further comprising:
   heating the microstructure to a temperature of from 20° C. to 120° C. during the step of repeatedly actuating the element or holding the element at the first deformed state.

8. The method of claim 6, further comprising:
   heating the microstructure to a temperature of from 120° C. to 200° C. during the step of repeatedly actuating the element or holding the element at the first deformed state.

9. The method of claim 6, further comprising:
   heating the microstructure to a temperature of from 200° C. to 500° C.

10. The method of claim 1, wherein the element comprises an early transition metal nitride.

11. The method of claim 1, wherein the step of repeatedly actuating the element further comprising:
    repeatedly actuating the element that is a hinge of a micromirror device, the hinge having a mirror plate attached thereto such that the mirror plate is operable to rotate.

12. The method of claim 1, wherein the step of holding the element at the deformed state for the particular time period further comprises:
    holding the element at the deformed state for a particular time period of from 5 minutes to 500 hours.

13. The method of claim 1, wherein the step of holding the element at the deformed state for the particular time period further comprises:
    holding the element at the deformed state for a particular time period of from 20 minutes to 24 hours.

14. The method of claim 1, further comprising:
    obtaining a development of plastic deformation in the element over time; and
    determining the particular time period according to the obtained development of the plastic deformation.

15. The method of claim 14, wherein the step of determining the particular time period further comprises:
    determining an initial amount of the plastic deformation that is developed during a first time period and is at least 1% of the maximum plastic deformation that can be developed by the deformable element; and
    determining the particular time period for holding the element at the deformed state according to the first time period such that after holding the element for the particular time period, the acquired deformation encompasses the initial amount of the plastic deformation.

16. The method of claim 1, wherein the initial amount of the plastic deformation is at least 3% or more of the maximum plastic deformation.

17. The method of claim 1, wherein the initial amount of the plastic deformation is at least 5% or more of the maximum plastic deformation.

18. The method of claim 1, wherein the initial amount of the plastic deformation is at least 60% or more of the maximum plastic deformation.

19. The method of claim 1, further comprising:
packaging the microstructure before performing the steps of deforming the element.

20. The method of claim 1, further comprising:
packaging the microstructure after the steps of defining the new non-deformed state.

21. The method of claim 1, wherein the step of deforming the element to the deformed state further comprises:
rotating a mirror plate that is attached to the deformable element to an ON state angle on a substrate, wherein the ON state angle is from 10° to 18° between the mirror plate and the substrate.

22. The method of claim 1, wherein the deformable element comprises a material that is an elemental metal, metalloid, metallic compound or ceramic.

23. The method of claim 1, wherein the deformable element comprises a material that is polycrystalline, amorphous or nanocrystalline.

24. A method for improving the performance of a device having a movable microstructure that comprises a deformable element that plastically deforms and operates in a first deformed state and a second state, the method comprising:
predetermining an amount of desired plastic deformation of the element at a non-actuated state;
repeatedly actuating the element to a first deformed state; or holding the element at the first deformed state for a particular time period so as to cause the element to acquire the desired amount of plastic deformation at the non-actuated state; and
delivering the device to a customer.

25. The method of claim 24, wherein the step of repeatedly actuating the element further comprises:
repeatedly actuating the element to the first deformed state in response to a series of signals each corresponding to an ON state so as to achieve a maximized brightness.

26. The method of claim 24, wherein the customer is a retail customer.

27. The method of claim 24, wherein the step of repeatedly actuating the element further comprising:
repeatedly actuating the element that is a hinge of a micromirror device, the hinge having a mirror plate attached thereto such that the mirror plate is operable to rotate.

28. The method of claim 24, wherein the step of holding the element at the deformed state for the particular time period further comprises:
holding the element at the deformed state for a particular time period of from 5 minutes to 500 hours.

29. The method of claim 28, further comprising:
heating the microstructure to a temperature of from 20° C. to 120° C. during the step of repeatedly actuating the element or holding the element at the first deformed state.

30. The method of claim 29, wherein the step of determining the particular time period further comprises:
determining an initial amount of the plastic deformation that is developed during a first time period and is at least 1% of the maximum plastic deformation that can be developed by the deformable element; and
determining the particular time period for holding the element at the deformed state according to the first time period such that after holding the element for the particular time period, the acquired deformation encompasses the initial amount of the plastic deformation.

31. The method of claim 28, further comprising:
heating the microstructure to a temperature of from 120° C. to 200° C. during the step of repeatedly actuating the element or holding the element at the first deformed state.

32. The method of claim 31, wherein the initial amount of the plastic deformation is at least 3% or more of the maximum plastic deformation.

33. The method of claim 31, wherein the initial amount of the plastic deformation is at least 5% or more of the maximum plastic deformation.

34. The method of claim 31, wherein an initial amount of the plastic deformation is at least 60% or more of the maximum plastic deformation.

35. The method of claim 28, further comprising:
heating the microstructure to a temperature of from 200° C. to 500° C. during the step of repeatedly actuating the element or holding the element at the first deformed state.

36. The method of claim 24, wherein the step of holding the element at the deformed state for the particular time period further comprises:
holding the element at the deformed state for a particular time period of from 20 minutes to 24 hours.

37. The method of claim 24, further comprising:
obtaining a development of plastic deformation in the element over time; and
determining the particular time period according to the obtained development of the plastic deformation.

38. The method of claim 29, wherein the step of determining the pattern further comprises:
determining an initial amount of the plastic deformation that is developed during a first time period and is at least 1.5% or more of the maximum plastic deformation.

39. The method of claim 24, further comprising:
packaging the microstructure before performing the steps of deforming the element.

40. The method of claim 24, further comprising:
packaging the microstructure after the steps of defining the new non-deformed state.

41. The method of claim 24, wherein the step of deforming the element to the deformed state further comprises:
rotating a mirror plate that is attached to the deformable element to an ON state angle on a substrate, wherein the ON state angle is from 10° to 18° between the mirror plate and the substrate.

42. The method of claim 24, wherein the deformable element comprises a material that is an elemental metal, metalloid, metallic compound, or ceramic.

43. The method of claim 42, wherein the particular time period is from 1 to 24 hours.

44. The method of claim 24, wherein the deformable element comprises a material that is polycrystalline, amorphous or nanocrystalline.

45. The method of claim 44, further comprising: raising the temperature of the microstructure to a value of from 20° to 120° C. during the step of repeatedly actuating the element or holding the element at the first deformed state.

46. The method of claim 44, further comprising: raising the temperature of the microstructure to a value of from 120° to 200° C. during the step of repeatedly actuating the element or holding the element at the first deformed state.

47. The method of claim 44, further comprising: raising the temperature of the microstructure to a value of from 200° to 500° C. during the step of repeatedly actuating the element or holding the element at the first deformed state.

48. A method for improving the performance of a device having a movable microstructure that comprises an element that plastically deforms and operates in a first deformed state and a second state, the method comprising:
acquiring an amount of plastic deformation, comprising:
repeatedly actuating the element to the first deformed state; or holding the element at the
first deformed state for a time period of 1 hour or more so as to cause the element to acquire an amount of plastic deformation; and
shipping the device to a customer.

49. The method of claim 48, wherein the step of acquiring the amount of plastic deformation further comprises:
holding the element at the first deformed state for a time period of 10 hours or more.

50. The method of claim 49, wherein the step of deforming the element to the deformed state further comprises:
rotating a mirror plate that is attached to the deformable element to an ON state angle on a substrate, wherein the ON state angle is from 10° to 18° between the mirror plate and the substrate.

51. The method of claim 49, wherein the particular time period is from 5 minutes to 800 hours.

52. The method of claim 48, wherein the step of acquiring the amount of plastic deformation further comprises:
holding the element at the first deformed state for a time period of 50 hours or more.

53. The method of claim 52, wherein the step of determining the particular time period further comprises:
determining an initial amount of the plastic deformation that is developed during a first time period and is at least 1% of the maximum plastic deformation that can be developed by the deformable element; and
determining the particular time period for holding the element at the deformed state according to the first time period such that after holding the element for the particular time period, the acquired deformation encompasses the initial amount of the plastic deformation.

54. The method of claim 48, wherein the step of acquiring the amount of plastic deformation further comprises:
holding the element at the first deformed state for a time period of 100 hours or more.

55. The method of claim 54, wherein an initial amount of the plastic deformation is at least 3% or more of the maximum plastic deformation.

56. The method of claim 54, wherein an initial amount of the plastic deformation is at least 5% or more of the maximum plastic deformation.

57. The method of claim 54, wherein an initial amount of the plastic deformation is at least 60% or more of the maximum plastic deformation.

58. The method of claim 48, wherein the step of repeatedly actuating the element further comprises:
repeatedly actuating the element to the first deformed state in response to a series of signals each corresponding to an ON state so as to achieve a maximized brightness.

59. The method of claim 48, further comprising:
obtaining a development of plastic deformation in the element over time; and
determining the particular time period according to the obtained development of the plastic deformation.

60. The method of claim 48, wherein the deformable element comprises a material that is an elemental metal, metalloid, metallic compound or ceramic.

61. The method of claim 48, wherein the deformable element comprises a material that is polycrystalline, amorphous or nanocrystalline.

62. The method of claim 48, further comprising:
packaging the microstructure before performing the steps of acquiring the amount of plastic deformation.

63. The method of claim 48, further comprising:
packaging the microstructure after the steps of acquiring the amount of plastic deformation.

64. A method of improving the lifetime of a spatial light modulator having an array of micromirrors, wherein each micromirror comprises a reflective mirror plate attached to a deformable hinge such that the mirror plate can rotate between an ON and OFF state, the method comprising:
acquiring an amount of plastic deformation for the deformable hinge of one of the micromirrors of the array;
defining a new OFF state according to the original OFF state and the acquired plastic deformation; and
operating said one of the micromirrors of the array at the new OFF state and the ON state.

65. The method of claim 64, wherein the step of acquiring the amount of plastic deformation further comprises:
setting the mirror plates to a deformed state; and
holding the mirror plates at the deformed state for a particular time period.

66. The method of claim 65, wherein the step of holding the mirror plates at the deformed state for the particular time period further comprises:
holding the mirror plates at the deformed state for a particular time period of from 5 minutes to 500 hours.

67. The method of claim 65, wherein the step of holding the mirror plates at the deformed state for the particular time period further comprises:
holding the mirror plates at the deformed state for a particular time period of from 20 minutes to 24 hours.

68. The method of claim 65, further comprising;
heating the micromirrors to a temperature of from 20° C. to 120° C. during repeatedly actuating or holding the mirror plates at the deformed state.

69. The method of claim 65, further comprises:
heating the micromirrors to a temperature of from 120° C. to 200° C. during repeatedly actuating or holding the mirror plates at the deformed state.

70. The method of claim 65, further comprising:
heating the micromirrors to a temperature of from 200° C. to 500° C. during repeatedly actuating or holding the mirror plates at the deformed state.

71. The method of claim 65, wherein the step of setting the mirror plates to the deformed state further comprises:
rotating a mirror plate that is attached to the deformable hinge to an ON state angle on a substrate, wherein the ON state angle is from 10° to 18° between the mirror plate and the substrate.

72. The method of claim 64, further comprising:
calibrating the micromirror based on the new OFF state such that the micromirror can be operated in the ON state and the new OFF state.

73. The method of claim 64, further comprising:
obtaining a development of plastic deformation in the deformable hinge over time; and determining a particular time period according to the obtained development of the plastic deformation.

74. The method of claim 73, wherein the step of determining the particular time period further comprises:
   determining an initial amount of the plastic deformation that is developed during a first time period and is at least 1% of the developed maximum plastic deformation; and
   determining the particular time period for holding the mirror plate at the deformed state according to the first time period such that after holding the mirror plate for the particular time period, the acquired deformation encompasses the initial amount of the plastic deformation.

75. The method of claim 74, wherein the initial amount of the plastic deformation is at least 1.5% or more of the maximum plastic deformation.

76. The method of claim 75, wherein the initial amount of the plastic deformation is at least 3% or more of the maximum plastic deformation.

77. The method of claim 76, wherein the initial amount of the plastic deformation is at least 5% or more of the maximum plastic deformation.

78. The method of claim 77, wherein the initial amount of the plastic deformation is at least 60% or more of the maximum plastic deformation.

79. The method of claim 64, further comprising:
   packaging the micromirror before performing the steps of acquiring the amount of plastic deformation.

80. The method of claim 64, further comprising:
   packaging the micromirror after the steps of acquiring the amount of plastic deformation.

81. The method of claim 64, wherein the deformable hinge comprises a material that is an elemental metal, metalloid, metallic compound or ceramic.

82. The method of claim 64, wherein the deformable hinge comprises a material that is polycrystalline, amorphous or nanocrystalline.

* * * * *